(12) United States Patent  
Jacobsen (10) Patent No.: US 6,352,068 B1
(45) Date of Patent: Mar. 5, 2002

(54) METHOD AND APPARATUS FOR REDUCING OXIDES OF NITROGEN IN THE EXHAUST GAS OF AN INTERNAL COMBUSTION ENGINE

(75) Inventor: Arthur J. Jacobsen, Dublin, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/472,554

(22) Filed: Dec. 27, 1999

(51) Int. Cl.$^7$ ................................................. F02B 23/00
(52) U.S. Cl. ....................................................... 123/585
(58) Field of Search ................................. 123/585, 587, 123/568.15, 559.1, 559.2, 698, 699, 26, 563

(56) References Cited

U.S. PATENT DOCUMENTS

| 4,203,958 A | * | 5/1980 | Snarski ........................ 423/351 |
| 4,744,803 A | * | 5/1988 | Knaebel ........................ 95/98 |
| 4,927,434 A | * | 5/1990 | Cordes et al. ................. 95/15 |
| 5,457,958 A | | 10/1995 | Boegner et al. .............. 60/279 |
| 5,636,619 A | * | 6/1997 | Poola et al. .................. 123/585 |
| 5,640,845 A | * | 6/1997 | Ng et al. ........................ 60/274 |
| 5,649,517 A | | 7/1997 | Poola et al. .................. 123/585 |
| 5,910,097 A | | 6/1999 | Boegner et al. .............. 60/278 |
| 5,912,426 A | * | 6/1999 | Smolarek et al. ............. 96/115 |
| 5,960,777 A | | 10/1999 | Nemser et al. .............. 123/585 |
| 6,055,808 A | * | 5/2000 | Poola et al. ................... 60/274 |
| 6,059,858 A | * | 5/2000 | Lin et al. ........................ 95/96 |
| 6,067,973 A | * | 5/2000 | Chanda et al. .............. 123/585 |
| 6,173,567 B1 | * | 1/2001 | Poola et al. ................... 60/274 |

\* cited by examiner

*Primary Examiner*—Willis R. Wolfe
*Assistant Examiner*—Hai Huynh
(74) *Attorney, Agent, or Firm*—Rankin, Hill, Porter & Clark LLP (57) ABSTRACT

A method and apparatus for reducing oxides of nitrogen in the exhaust of an internal combustion engine. The apparatus includes a pressurizing unit for providing compressed air to a pressure swing adsorption unit. The pressure swing adsorption removes nitrogen from the air to produce nitrogen-reduced air, which is then supplied to the engine. The pressurizing unit may be a compressor, a turbocharger, or a supercharger. The engine may utilize exhaust gas recirculation and fuel injection with air assist.

27 Claims, 6 Drawing Sheets

METHOD AND APPARATUS FOR REDUCING OXIDES OF NITROGEN IN THE EXHAUST GAS OF AN INTERNAL COMBUSTION ENGINE

BACKGROUND OF THE INVENTION

This invention relates to internal combustion engines in general and, more particularly, to methods and apparatus for reducing oxides of nitrogen in the exhaust of internal combustion engines.

The exhaust gas from an internal combustion engine includes a number of undesirable compounds, such as carbon monoxide, hydrocarbons, and oxides of nitrogen ($NO_x$), namely nitrogen dioxide ($NO_2$) and nitric oxide (NO). $NO_x$ is formed at the high temperatures encountered in the combustion flame and increase in formation as the combustion temperature increases. Exhausting $NO_x$ into the air has detrimental effects on the environment. $NO_x$ can photoreact and create air pollution and/or chemically react and contribute to acid rain. Accordingly, various systems have been developed to reduce $NO_x$ in the exhaust of internal combustion engines.

One such system is an exhaust-gas recirculation (EGR) system, wherein a portion of the exhaust gas is introduced into an air intake of the engine, thereby lowering the total oxygen concentration of the intake charge. Lowering the oxygen concentration decreases the peak combustion temperature, which, in turn, reduces the formation of $NO_x$.

Although an EGR system reduces $NO_x$ formation, an EGR system increases hydrocarbon emissions. Moreover, only so much air can be replaced with the recycled exhaust gas before combustion becomes unstable.

Another system that is used to reduce $NO_x$ in exhaust gas is catalytic reduction, wherein $NO_x$ is removed from the exhaust gas by reaction with in-situ reductants, such as carbon monoxide or hydrocarbons (HC), when passed over a catalyst, typically containing rhodium. Such catalytic reduction, however, cannot cost-effectively reduce $NO_x$ to meet more stringent future government regulations.

Based on the foregoing, there is a need in the art for an improved method and apparatus for reducing oxides of nitrogen in the exhaust of an internal combustion engine. The present invention is directed to such a method and apparatus.

SUMMARY OF THE INVENTION

It therefore would be desirable, and is an advantage of the present invention, to provide an engine system having an internal combustion engine with a plurality of cylinders. Each of the cylinders has an intake port and an exhaust port. An air intake system is provided through which air is directed to the cylinders of the engine, and an exhaust system is provided for directing exhaust gas generated by combustion in the cylinders to the outside atmosphere. A pressurizing unit and a pressure swing adsorption unit are also provided. The pressure swing adsorption unit has an inlet connected to the pressurizing unit to receive compressed air therefrom, and an outlet connected to the air intake system of the engine. The pressure swing adsorption unit also includes an adsorbent bed cyclable between a production mode, wherein nitrogen in the air is adsorbed by the adsorbent bed at an elevated pressure to produce nitrogen-reduced air, and a regeneration mode, wherein nitrogen is desorbed from the adsorbent bed at a reduced pressure to produce nitrogen gas. The nitrogen-reduced air from the production mode of the adsorbent bed is supplied to the air intake system of the engine.

Also provided in accordance with the present invention is an air supply system for an internal combustion engine. The air supply system includes a pressurizing unit and a pressure swing adsorption unit, as described above. The air supply system further includes an air filter through which air may be directed to the pressurizing unit, and an air dryer connected between the air filter and the pressurizing unit. The air dryer contains a desiccant for removing water from the filtered air.

Also provided in accordance with the present invention is a method of reducing $NO_x$ in the exhaust of an internal combustion engine. The method includes the steps of providing an adsorbent bed and pressurizing air. The pressurized air is passed through the adsorbent bed, thereby raising the pressure of the adsorbent bed and causing the adsorbent bed to adsorb nitrogen from the air to produce nitrogen-reduced air. The nitrogen-reduced air is then directed into an air intake system of the engine. In another step, the pressure in the adsorbent bed is reduced such that nitrogen desorbs from the adsorbent bed. The nitrogen is then directed to the outside atmosphere.

Also provided in accordance with the present invention is an engine system including an internal combustion engine having an air intake system. Means for producing compressed air are provided. Also provided are means for producing nitrogen-reduced air and nitrogen gas from the compressed air using changes in pressure. The nitrogen-reduced air is provided to the air intake system of the engine.

BRIEF DESCRIPTION OF THE DRAWINGS

The features, aspects, and advantages of the present invention will become better understood with regard to the following description, appended claims, and accompanying drawings where:

DETAILED DESCRIPTION OF THE PREFERRED EMBODIMENTS

It should be noted that in the detailed description which follows, identical components have the same reference numerals, regardless of whether they are shown in different embodiments of the present invention. It should also be noted that in order to clearly and concisely disclose the present invention, the drawings may not necessarily be to scale and certain features of the invention may be shown in somewhat schematic form.

Generally, the method and apparatus of the present invention reduces $NO_x$ in the emission of an internal combustion engine by removing nitrogen from air entering the engine. The nitrogen is removed from the air using adsorption. As is well known, adsorption is the surface retention of solid, liquid, or gas molecules, atoms, or ions by a solid or a liquid. Preferably, the nitrogen is removed from the air using physical adsorption, which depends upon the physical or van der Waals forces of attraction between a solid adsorbent and the nitrogen. Physical adsorption is preferred because it is characterized by low heats of adsorption and by rapid adsorption and desorption. The ability to desorb the nitrogen from the solid adsorbent is of particular importance because it permits the solid adsorbent to be regenerated and used indefinitely. Preferably, the nitrogen is desorbed or regenerated by a reduction in pressure. An adsorptive process using such a change or swing in pressure is commonly referred to as pressure swing adsorption (PSA).

Figure 1:
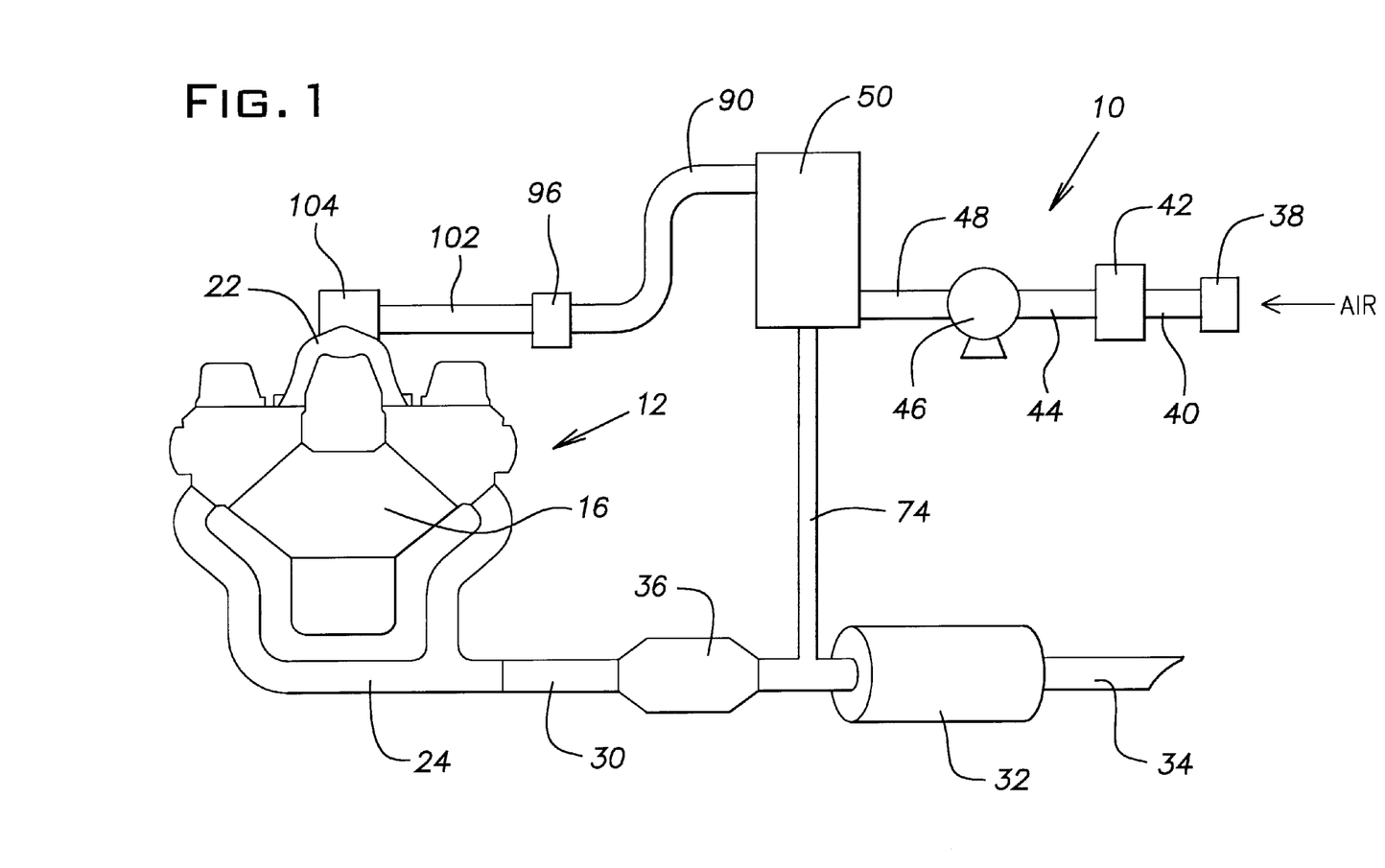
FIG. 1 shows a schematic diagram of a first engine system having a pressure swing adsorption unit.

Referring now to FIG. 1, there is shown a schematic diagram of a first engine system 10 provided in accordance with a first embodiment of the present invention. The first engine system 10 includes an internal combustion engine 12, which may be a spark ignition engine, or a compression or diesel engine. Conventionally, the engine 12 includes a plurality of combustion chambers or cylinders 14 (shown in FIG. 3) provided in a cylinder block 16. Each of the cylinders 14 includes an intake port 18 and an exhaust port 20. A piston 21 is movably disposed in each cylinder 14. The engine 12 may be used in a passenger automobile, watercraft, a lawn mower, a truck, a tractor, an electric generator, or any other vehicle or device that utilizes an internal combustion engine.

The engine system 10 further includes an air intake system for routing air to each cylinder 14, and an exhaust system for directing exhaust gas generated by combustion in the cylinders 14 to the atmosphere. The air intake system includes an intake manifold 22 that is connected to each of the intake ports 18 of the cylinders 14, while the exhaust system includes an exhaust manifold 24 that is connected to each of the exhaust ports 20 of the cylinders 14. The exhaust manifold 24 is connected by an exhaust pipe 30 to a muffler 32 and tail pipe 34. A catalytic converter 36 may be disposed in the exhaust pipe 30.

Ambient atmospheric air is admitted to the air intake system through a first air filter 38, which has a conventional structure and is operable to remove particulate matter from the air. The filtered air then passes through a duct 40 to an air dryer 42 containing a desiccant that removes water from the filtered air. The desiccant may be a solid desiccant, such as a silica gel, or activated alumina. From the air dryer 42, the dry filtered air passes through a duct 44 and enters the inlet of a compressor 46, which may be driven by an electric motor (not shown) that receives direct current power from an electrical supply, such as a battery. Alternately, the compressor 46 may be driven by the engine 12 through a mechanical connection, such as a combination of belts and pulleys. The compressor 46 raises the pressure of the dry filtered air and discharges the pressurized air through a duct 48 to a pressure swing adsorption (PSA) unit 50.

Figure 2:
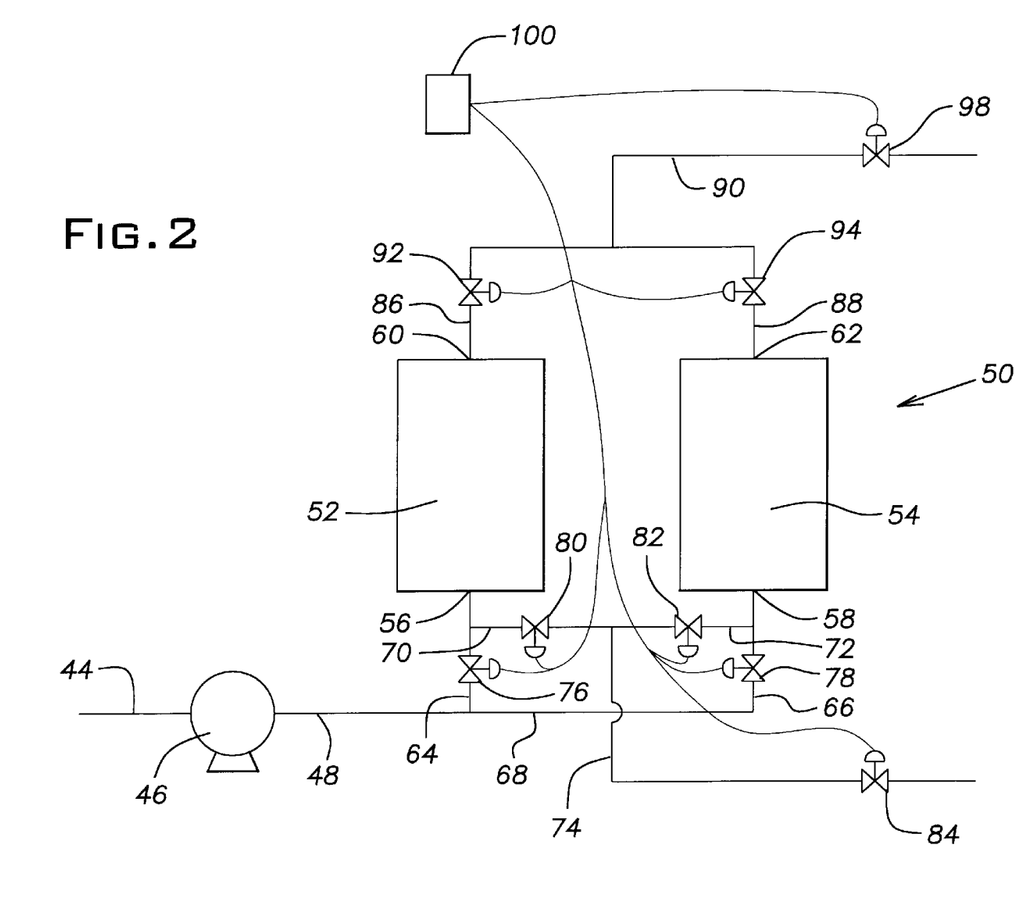
FIG. 2 shows a schematic diagram of the pressure swing adsorption unit.

The PSA unit 50 may have a construction as shown in FIG. 2, wherein a first adsorbent bed 52 and a second adsorbent bed 54 are utilized. The first and second adsorbent beds 52, 54 have a monolithic structure and comprise crystalline zeolites that adsorb nitrogen in greater preference to oxygen. Preferably, the zeolites have a pore size of at least 5 Angstroms. Examples of zeolites that may be used in the first and second adsorbent beds 52, 54 include MS-5A, MS-10X, MS-13X, and mordenite, as well as other zeolites that have been subjected to ion exchange of metal therein so as to obtain a pore size of at least 5 Angstroms.

The first and second adsorbent beds 52, 54 have first ports 56, 58 and second ports 60, 62, respectively. The first ports 56, 58 are connected by input conduits 64, 66 to an input manifold 68, and by output conduits 70, 72 to an output manifold 74. The input manifold 68 is connected to the duct 48, while the output manifold 74 is connected to the exhaust pipe 30, downstream of the catalytic converter 36, as shown in FIG. 1. Input valves 76, 78 are respectively disposed in the input conduits 64, 66, while output valves 80, 82 are respectively disposed in the output conduits 70, 72. A main output valve 84 may be disposed in the output manifold 74.

The second ports 60, 62 are connected by exit conduits 86, 88 to an exit manifold 90. Exit valves 92, 94 are respectively disposed in the exit conduits 86, 88. As shown in FIG. 1, the exit manifold 90 is connected to a second air filter 96, which also has a conventional structure and is operable to remove particulate matter. A feed valve 98 may be disposed in the exit manifold 90.

The compressor 46 and the PSA unit 50 are activated when the engine 12 is started. When activated, the PSA unit 50 operates in the following manner. In a first stage, the input valve 76 of the first adsorbent bed 52 opens and the input valve 78 of the second adsorbent bed 54 closes. Compressed feed air from the input manifold 68 enters the first adsorbent bed 52 through the first port 56. The pressure in the first adsorbent bed 52 rises and nitrogen is adsorbed by the zeolites. Nitrogen-reduced air exits the first adsorbent bed 52 through the second port 60 and travels to the second air filter 96 through the exit conduit 86 and the exit manifold 90.

During the first stage, the output valve 82 of the second adsorbent bed 54 opens and the pressure in the second adsorbent bed 54 drops. Nitrogen desorbs from the zeolites and exits the second adsorbent bed 54 through the first port 58. The nitrogen travels to the output manifold 74 through the output conduit 72. As the pressure in the second adsorbent bed drops 54, nitrogen-reduced air from the first adsorbent bed 52 enters the second adsorbent bed 54 through the second port 62. The nitrogen-reduced air helps purge the nitrogen from the second adsorbent bed 54.

After a period of time, the output valve 82 of the second adsorbent bed 54 closes to build up pressure in the second adsorbent bed 54 for a second stage of operation. In the second stage, the input valve 76 of the first adsorbent bed 52 closes and the input valve 78 of the second adsorbent bed opens. The second stage corresponds to the first stage and proceeds in like manner, except now the second adsorbent bed 54 produces nitrogen-reduced air and the first adsorbent bed 52 is regenerated.

At the conclusion of the second stage, the first stage is performed again. In this manner, the PSA unit 50 continuously cycles between the first and second stages while the engine 12 is running, alternating each of the first and second adsorbent beds 52, 54 between a production mode, wherein nitrogen in the feed air is adsorbed by the zeolites at an elevated pressure to produce nitrogen-reduced air, and a regeneration mode, wherein nitrogen is desorbed from the zeolites at a reduced pressure to produce nitrogen ($N_2$) gas. Throughout this cycling, nitrogen-reduced air is continuously provided to the exit manifold 90, and nitrogen gas is continuously provided to the output manifold 74.

Preferably, the input valves 76, 78, the output valves 80, 82, the main output valve 84, the exit valves 92, 94, and the feed valve 98 are electromagnetic solenoid valves that are electrically connected to an electronic control unit 100, which controls the opening and closing of the valves to cycle the PSA unit 50 through the first and second stages.

It is considered apparent that the present invention is not limited to the pressure swing adsorption unit described above and shown in FIG. 2. Rather, other pressure swing units may be employed with equal functionality and without departing from the scope and spirit of the present invention as embodied in the claims appended hereto. For example, a pressure swing adsorption unit having four adsorbent beds may be used for the PSA unit 50. In such a pressure swing adsorption unit having four adsorbent beds, two pairs of adsorbent beds may be provided, wherein each pair of adsorbent beds has the structure and function of the first and second adsorbent beds 52, 54. The two pairs of adsorbent beds may run in phase or out of phase relative to each other. Alternately, such a pressure swing adsorption unit having four adsorption beds may have two pairs of adsorbent beds, wherein in each pair of adsorbent beds, the adsorbent beds are serially connected to each other, and operate in the same mode together.

As described above, when the engine 12 is running, the PSA unit 50 continuously provides nitrogen-reduced air to the exit manifold 90 and nitrogen to the output manifold 74. The nitrogen-reduced air passes through the second air filter 96, which removes particulate matter that may have been introduced by the PSA unit 50 or that remained in the air after passing through the first air filter 38. The filtered nitrogen-reduced air then travels through a feed conduit 102 to a supply chamber 104 connected to an inlet of the intake manifold 22. From the intake manifold 22, the nitrogen-reduced air enters the cylinders 14 through the intake ports 18. In the cylinders 14, the nitrogen-reduced air is mixed with fuel and the mixture is combusted. Since the amount of nitrogen in the air is reduced, less $NO_x$ is produced during combustion.

The nitrogen exiting the PSA unit 50 through the output manifold 74 travels through the exhaust pipe 30 and the muffler 32, and is discharged from the tail pipe 34 into the outside atmosphere, along with exhaust gas from the combustion in the cylinders 14.

Figure 3:
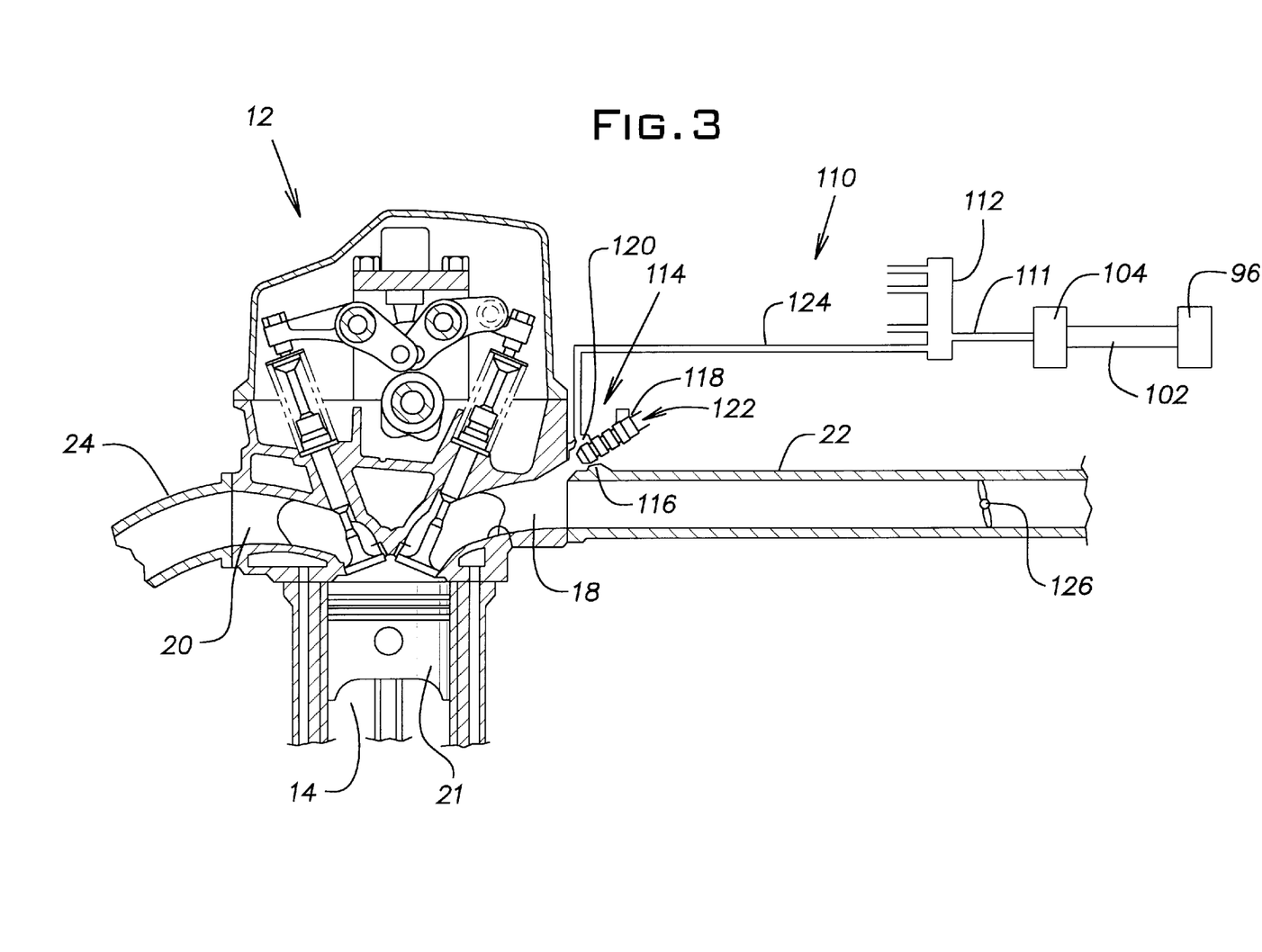
FIG. 3 shows a portion of a second engine system having the pressure swing adsorption unit.

Referring now to FIG. 3, there is shown a second embodiment of the present invention. More specifically, FIG. 3 shows a portion of a second engine system 110, which is the same as the first engine system 10, except for the differences described below.

In the second engine system 110, instead of being connected to the inlet of the intake manifold 22, the supply chamber 104 is connected by a duct 111 to an air header 112, which is a part of the air intake system and provides air to fuel injectors 114 for the cylinders 14. Each of the fuel injectors 114 includes a mount 116 joined to the intake manifold 22. The mount 116 has a lower wall defining an opening directed obliquely downward, toward the intake port 18. A fuel injection valve 118 extends into the mount 116 and is sealingly secured thereto. An air chamber 120 is formed between the mount 116 and the fuel injection valve 118. The fuel injection valve 118 is connected to a fuel supply source 122 and has a fuel ejection port disposed in the opening of the mount 116. Air assist ejection ports are formed between the lower wall and opposite sides of the fuel ejection port. The air assist ejection ports are connected to the air chamber 20.

The air header 112 is connected by an air passage 124 to each air chamber 120 in the fuel injectors 114. In this manner, the nitrogen-reduced air from the PSA unit 50 flows through the second air filter 96, the feed conduit 102, the supply chamber 104, and the duct 111, and enters the air header 112. From the air header 112, the nitrogen-reduced air travels through the air passages 124 to each of the air chambers 120 in the fuel injectors 114. In each fuel injector 114, the nitrogen-reduced air is ejected from the air chamber 120 through the air assist ejection ports and toward a fuel jet issuing from the fuel ejection port. The fuel particles in the fuel jet are finely atomized by collision with the nitrogen-depleted air, thereby providing for efficient combustion in the cylinder 14.

In contrast to conventional air assist systems, which rely on engine vacuum to pull air into fuel injectors, the nitrogen-reduced air is provided to the fuel injectors 114 under pressure. The pressurization of the nitrogen-reduced air helps reduce the droplet size of the fuel that is produced when the nitrogen-reduced air collides with the fuel. This reduction in droplet size helps reduce the amount of CO and hydrocarbons that are exhausted after combustion.

As can be readily appreciated, the reduction of nitrogen in the air provided to the fuel injectors 114 increases the concentration of oxygen in the air. This increase in oxygen concentration improves the air/fuel mixture and makes the mixture more favorable for combustion even under cold or lean burn conditions. Moreover, the reduction of nitrogen decreases the $NO_x$ produced during combustion.

It should be appreciated that the second engine system 110 can be modified to connect the supply chamber 104 to the inlet of the intake manifold 22, as in the first embodiment. The air header 112 is then connected to the intake manifold 22 at a location upstream of a throttle valve 126. In this manner, nitrogen-reduced air is supplied to both the fuel injectors 114 and to the intake manifold 22.

Figure 4:
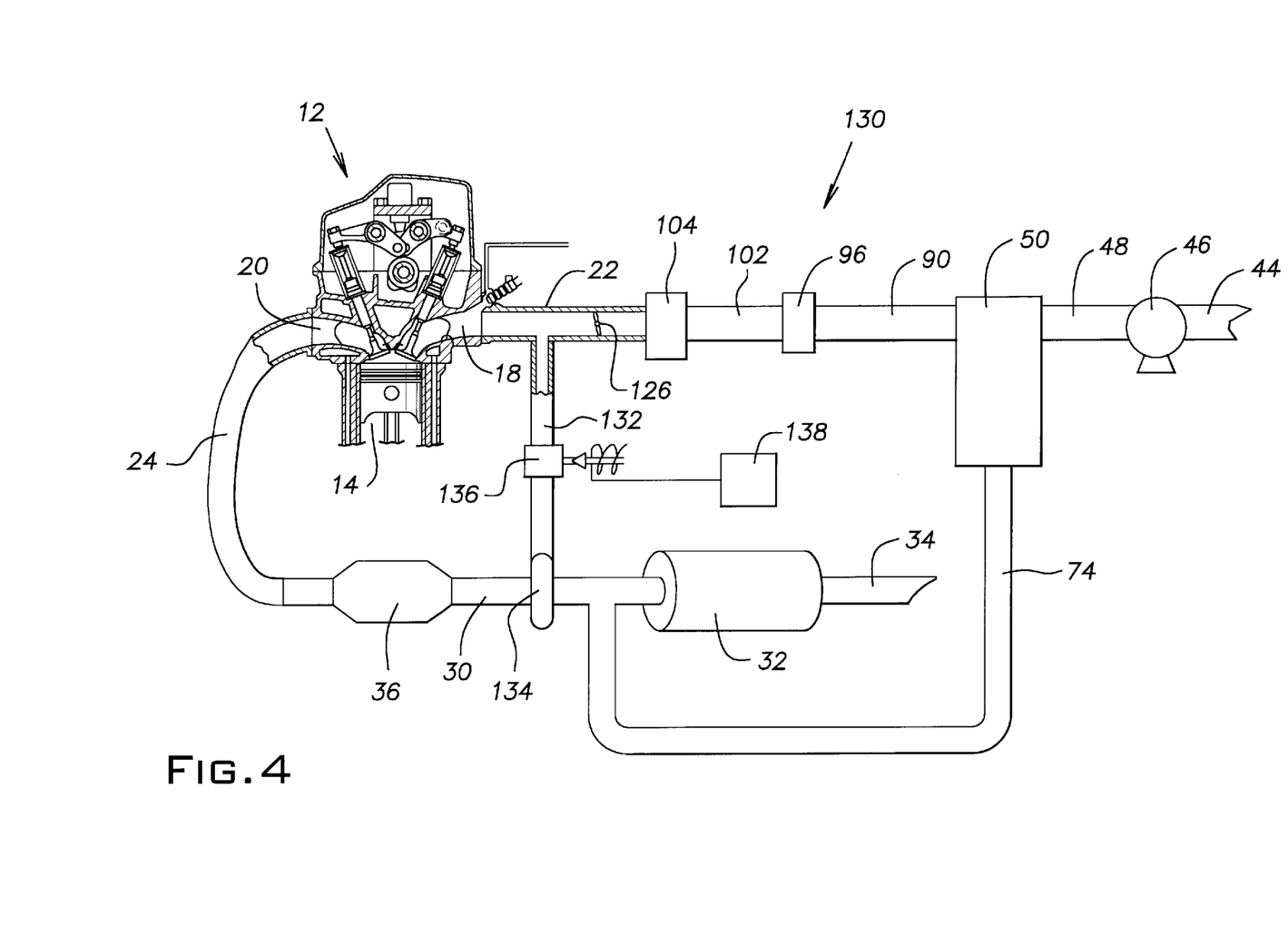
FIG. 4 shows a schematic diagram of a portion of a third engine system having the pressure swing adsorption unit.

Referring now to FIG. 4, there is shown a third embodiment of the present invention. More specifically, FIG. 4 shows a portion of a third engine system 130, which is the same as the first engine system 10, except for the differences described below.

The third engine system 130 includes an exhaust gas recirculation (EGR) duct 132 having an inlet connected by an annular bypass conduit 134 to the exhaust pipe 30, downstream of the catalytic converter 36. A plurality of openings (not shown) are formed in the exhaust pipe 30 and communicate with the interior of the bypass conduit 134, which is disposed around the exhaust pipe 30. An outlet of the EGR duct 132 is connected to the intake manifold 22, downstream of the throttle valve 126. An EGR control valve 136 is disposed in the EGR duct 132. The EGR control valve 136 is preferably an electromagnetic solenoid valve with variable travel that is electrically connected to an electronic control unit 138. The electronic control unit 138 controls the EGR control valve 136 and, thus, the flow of gas through the EGR duct 132 based on engine speed, engine load, and other variables.

During the operation of the engine 12 and the EGR system, exhaust gas from the cylinders 14 travels through the exhaust manifold 24 and the catalytic converter 36, and enters the bypass conduit 134 through the openings in the exhaust pipe 30. From the bypass conduit 134, the exhaust gas travels through the EGR duct 132 and enters the intake manifold 22. Nitrogen-reduced air from the PSA unit 50 flows through the second air filter 96, the feed conduit 102, and the supply chamber 104, and enters the intake manifold 22, where it mixes with the recycled exhaust gas from the EGR duct 132. The gas mixture then enters the cylinders 14 through the intake ports 18. In the cylinders 14, the gas is mixed with fuel and the mixture is combusted.

Since the reduction of nitrogen in the air provided to the intake manifold 22 increases the concentration of oxygen in the air, a greater amount of recycled exhaust gas can be used than in conventional EGR systems. In this manner, the recycled exhaust gas replaces the nitrogen that has been removed from the intake charge. This replacement permits the amount of nitrogen supplied to the cylinders 14 to be reduced without causing an increase in combustion temperature. Accordingly, a significant reduction of $NO_x$ in the exhaust gas emitted to the environment can be achieved.

Figure 5:
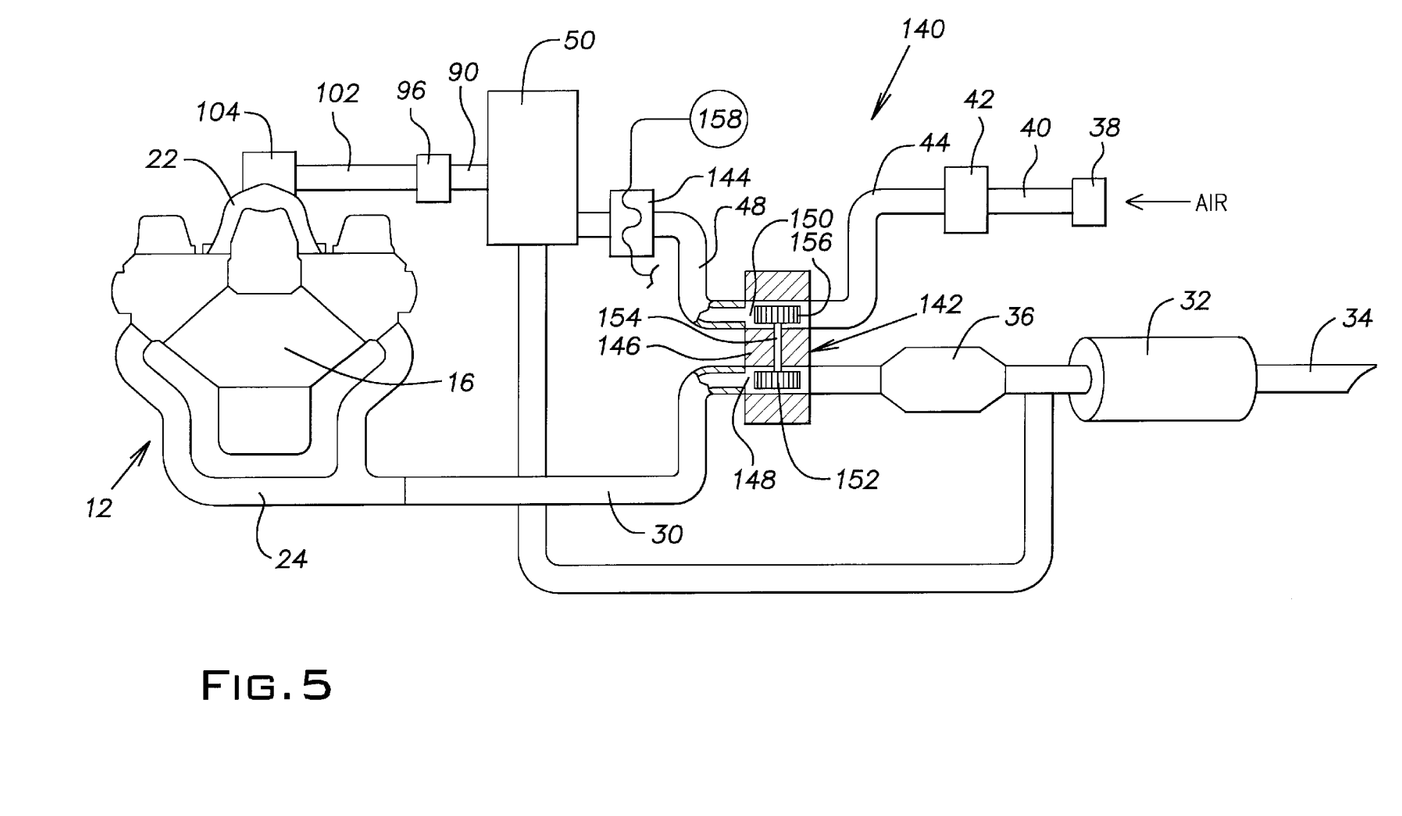
FIG. 5 shows a schematic diagram of a fourth engine system having the pressure swing adsorption unit.

Referring now to FIG. 5, there is shown a fourth embodiment of the present invention. More specifically, FIG. 4 shows a fourth engine system 140, which is the same as the first engine system 10, except for the differences described below.

The compressor 44 has been replaced with a turbocharger 142. In addition, an intercooler 144 may be provided. The turbocharger 142 has a conventional construction and includes a body 146 defining a drive passage 148 and a scroll passage 150. A turbine wheel 152 is disposed in the drive passage 148 and is connected by a main shaft 154 to a compressor wheel 156 disposed in the scroll passage 150. The drive passage 148 is connected into the exhaust pipe 30, upstream of the catalytic converter 36, while the scroll passage 150 is connected between the duct 44 and the duct 48. The intercooler 144 may connected into the duct 48 leading to the PSA unit 50.

During the operation of the engine 12, exhaust gas flows through the exhaust pipe 30 and into the drive passage 148 of the turbocharger 142. The exhaust gas rotates the turbine wheel 152, which, in turn, rotates the compressor wheel 156. Air from the air dryer 42 is compressed by the rotating compressor wheel 156 and forced to pass through the scroll passage 150. The compressed air exits the turbocharger 142 and enters the intercooler 144, where the compressed air is cooled in heat exchange fashion using water from a cooling system 158. The compressed air is then fed to the PSA unit 50.

Figure 6:
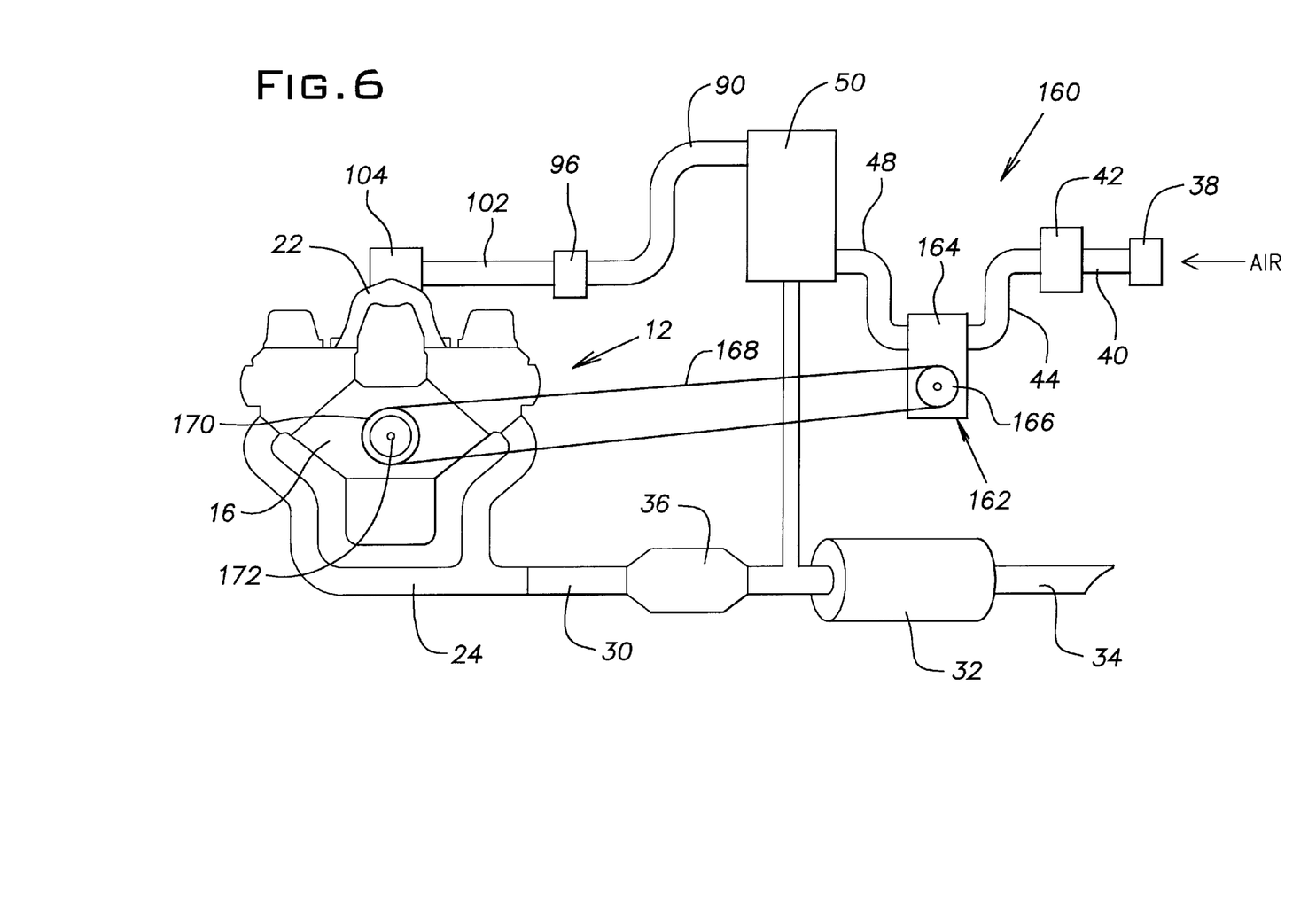
FIG. 6 shows a schematic diagram of a fifth engine system having the pressure swing adsorption unit.

Referring now to FIG. 6, there is shown a fifth embodiment of the present invention. More specifically, FIG. 5 shows a fifth engine system 160, which is the same as the first engine system 10, except for the differences described below.

The compressor 44 has been replaced with a supercharger 162 of conventional construction. The supercharger 162 includes a housing 164 defining an air passage (not shown) connected between the duct 44 and the duct 48. A rotor with vanes (not shown) is disposed in the air passage. The rotor is driven by a drive mechanism connected to a supercharger pulley 166. A drive belt 168 connects the supercharger pulley 166 to an engine pulley 170, which is secured to a crankshaft 172 of the engine 12.

During the operation of the engine 12, the drive belt 168 transfers the rotation of the crankshaft 172 to the supercharger pulley 166, thereby causing the drive mechanism to rotate the rotor. Air from the air dryer 42 is compressed by the rotating rotor and forced to pass through the air passage. The compressed air exits the supercharger 162 and is fed to the PSA unit 50 through the duct 48.

It should be appreciated that the fourth engine system 140 and the fifth engine system 160 provide the same benefits as the first engine system 10. The compressor 46, the turbocharger 142, and the supercharger 162 each function as a pressurizing unit to provide compressed air to the PSA unit 50. However, the use of the turbocharger 142 in lieu of the compressor 46 reduces the size of the fourth engine system 140, and the use of the supercharger 162 in lieu of the compressor 46, reduces the size of the fifth engine system 160. In this manner, the fourth engine system 140 and the fifth engine system 160 can be disposed in smaller engine compartments.

It should be appreciated that the features of the various embodiments of the present invention can be combined in a variety of ways to create different engine systems. For example, the turbocharger 142 of the fourth engine system 140 or the supercharger 162 of the fifth engine system 160 can be used in the second engine system 110 and/or the third engine system 130.

As described above, the first air filter 38, the air dryer 42, the PSA unit 50, the second air filter 96, and a pressurizing unit selected from the group consisting of the compressor 46, the turbocharger 142, and the supercharger 162, form an air supply system that provides nitrogen-reduced air to the air intake system of the engine 12. The provision of nitrogen-reduced air to the engine 12 reduces the amount of $NO_x$ in the exhaust of the engine 12. Thus, the air supply system of the present invention reduces $NO_x$ emission by pre-treating the air supplied to the engine 12, as opposed to post-treating the exhaust of the engine 12, as is conventionally done.

Although the preferred embodiments of this invention have been shown and described, it should be understood that various modifications and rearrangements of the parts may be resorted to without departing from the scope of the invention as disclosed and claimed herein.

What is claimed is:

1. An engine system comprising:
   an internal combustion engine having a plurality of cylinders, each of which has an intake port and an exhaust port;
   an air intake system through which air is directed to the cylinders of the engine;
   an exhaust system for directing exhaust gas generated by combustion in the cylinders to the outside atmosphere;
   a pressurizing unit operable to compress air; and
   a pressure swing adsorption unit having an inlet connected to the pressurizing unit to receive compressed air therefrom, and an outlet connected to the air intake system of the engine, said pressure swing adsorption unit including an adsorbent bed cyclable between a production mode, wherein nitrogen in the air is adsorbed by the adsorbent bed at an elevated pressure to produce nitrogen-reduced air, and a regeneration mode, wherein nitrogen is desorbed from the adsorbent bed at a reduced pressure to produce nitrogen gas, said nitrogen-reduced air from the production mode of the adsorbent bed being supplied to the air intake system of the engine.

2. The engine system of claim 1, further comprising an air filter through which air may be directed to the pressurizing unit, said air filter being operable to filter the air to remove particulates therein.

3. The engine system of claim 2, further comprising an air dryer connected between the air filter and the pressurizing unit, said air dryer containing a desiccant for removing water from the filtered air.

4. The engine system of claim 3, further comprising a second air filter connected between the pressure swing adsorption unit and the air intake system of the engine.

5. The engine system of claim 1, wherein the pressurizing unit is a compressor.

6. The engine system of claim 1, wherein the pressurizing unit is a turbocharger.

7. The engine system of claim 1, wherein the pressurizing unit is a supercharger.

8. The engine system of claim 1, wherein the pressure swing adsorption unit comprises a second adsorbent bed cyclable between a production mode, wherein nitrogen in the air is adsorbed by the second adsorbent bed at an elevated pressure to produce nitrogen-reduced air, and a regeneration mode, wherein nitrogen is desorbed from the second adsorbent bed at a reduced pressure to produce nitrogen gas, and wherein said nitrogen-reduced air from the production mode of the second adsorbent bed is supplied to the air intake system of the engine.

9. The engine system of claim 8, wherein when the adsorbent bed is in the production mode, the second adsorbent bed is in the regeneration mode, and when the second adsorbent bed is in the production mode, the adsorbent bed is in the regeneration mode.

10. The engine system of claim 9, wherein the first and second adsorbent beds are each continuously cycled between the production mode and the regeneration mode while the engine is running.

11. The engine system of claim 1, wherein the engine further comprises fuel injectors for the cylinders, and wherein the air intake system comprises an intake manifold for supplying air to the intake ports of the cylinder, and an air header for supplying air to the fuel injectors.

12. The engine system of claim 11, wherein the nitrogen-reduced air from the pressure swing adsorption unit is supplied to the air header.

13. The engine system of claim 11, wherein the nitrogen-reduced air from the pressure swing adsorption unit is supplied to the intake manifold.

14. The engine system of claim 13, wherein the nitrogen-reduced air from the pressure swing adsorption unit is also supplied to the air header.

15. The engine system of claim 1, further comprising an exhaust gas recirculation duct connected between the exhaust system and the air intake system, said exhaust gas recirculation duct being adapted to convey exhaust gases into the air intake system for mixing with the nitrogen-reduced air from the pressure swing adsorption unit.

16. The engine system of claim 15, further comprising a control valve disposed in the exhaust gas recirculation duct, said control valve being operable to control the flow of exhaust gas through the exhaust gas recirculation duct.

17. The engine system of claim 1, wherein the adsorbent bed is comprised of zeolites.

18. The engine system of claim 1, wherein the pressure swing adsorption unit further comprises three other adsorbent beds.

19. An air supply system for an internal combustion engine, said air supply system comprising:

a pressurizing unit operable to compress air;

an air filter through which air may be directed to the pressurizing unit, said air filter being operable to filter the air to remove particulates therein;

an air dryer connected between the air filter and the pressurizing unit, said air dryer containing a desiccant for removing water from the filtered air; and a pressure swing adsorption unit having an inlet connected to the pressurizing unit to receive compressed air therefrom, and an outlet for connection to an air intake system of the engine, said pressure swing adsorption unit including an adsorbent bed cyclable between a production mode, wherein nitrogen in the air is adsorbed by the adsorbent bed at an elevated pressure to produce nitrogen-reduced air, and a regeneration mode, wherein nitrogen is desorbed from the adsorbent bed at a reduced pressure to produce nitrogen gas, said nitrogen-reduced air from the production mode of the adsorbent bed exiting the pressure swing adsorption unit through the outlet.

20. The air supply system of claim 19, further comprising a second air filter connected to the outlet of the pressure swing adsorption unit.

21. The air supply system of claim 19, wherein the pressurizing unit is a compressor.

22. The air supply system of claim 19, wherein the pressurizing unit is a turbocharger.

23. The air supply system of claim 19, wherein the pressurizing unit is a supercharger.

24. The air supply system of claim 19, wherein the adsorbent bed is comprised of zeolites.

25. A method of reducing $NO_x$ in the exhaust of an internal combustion engine, said method comprising the steps of:

(a) providing an adsorbent bed;

(b) pressurizing air;

(c) passing the pressurized air through the adsorbent bed, thereby raising the pressure of the adsorbent bed and causing the adsorbent bed to adsorb nitrogen from the air to produce nitrogen-reduced air;

(d) directing the nitrogen-reduced air into an air intake system of the engine;

(e) reducing the pressure in the adsorbent bed such that nitrogen desorbs from the adsorbent bed; and (f) directing the nitrogen out of the adsorbent bed.

26. The method of claim 25, further comprising the step of directing exhaust gas into the air intake system of the engine for mixing with the nitrogen-reduced air from the adsorption bed.

27. The method of claim 25, wherein steps (c) through (f) are continuously repeated while the engine is running.

* * * * *